United States Patent

Jamison

[15] 3,671,471

[45] June 20, 1972

[54] DIACID-DIOL BASED FOAMS AND PROCESS OF MAKING SAME

[72] Inventor: Saunders E. Jamison, Summit, N.J.

[73] Assignee: Celanese Corporation

[22] Filed: May 4, 1970

[21] Appl. No.: 34,908

[52] U.S. Cl. ................260/2.5 R, 260/2.5 N, 260/75 U, 260/475 P
[51] Int. Cl. ..................................C08f 47/08
[58] Field of Search ..........260/2.5 D, 75 N, 475 P, 75 U, 260/2.5 R, 75 R, 2.5 N

[56] References Cited

UNITED STATES PATENTS

| | | | |
|---|---|---|---|
| 3,222,302 | 12/1965 | Böllert et al. | 260/2.5 D |
| 3,470,114 | 9/1969 | Siggel et al. | 260/2.5 D |
| 2,529,512 | 11/1950 | Ott | 260/2.5 N |
| 3,367,890 | 2/1968 | McManimie | 260/2.5 N |

Primary Examiner—Murray Tillman
Assistant Examiner—Morton Foelak
Attorney—Thomas J. Morgan, Marvin Turken and Charles E. Miller

[57] ABSTRACT

A rigid foam useful in insulating, molding and packaging, is prepared by (a) reacting a four to 10 carbon alpha-beta ethylenically unsaturated, dicarboxylic acid with a six to 50 carbon diol and (b) heating the resulting product to a temperature sufficient to effect decarboxylation of the resulting unsaturated diacid-diol adduct.

12 Claims, No Drawings

DIACID-DIOL BASED FOAMS AND PROCESS OF MAKING SAME

BACKGROUND OF THE INVENTION

This invention pertains to the preparation and use of certain synthetic foams. More particularly this invention pertains to the preparation of rigid insulative foams from an unsaturated diacid and a diol.

The use of rigid, semi-rigid and flexible foams is well known. Many varied materials have been foamed with varying degrees of success. At present the majority of foams are prepared from either polystyrene or polyurethane. However, epoxy, polyethylene, phenol-formaldehyde, urea-formaldehyde and polyvinyl chloride resins have also been used. The main drawback to the use of any of these foams is that they offer poor resistance to weathering and exterior exposure.

SUMMARY OF INVENTION

It has now been found that rigid foams possessing the desirable properties of previously prepared foams, yet also having excellent exterior durability, can be prepared by condensing an alpha-beta ethylenically unsaturated dicarboxylic acid with a six to 50 carbon atom containing glycol or diol. The diol can be either of the normally occuring type such as hexylene glycol or it can be prepared by reacting, for example, 2 mols of a mono epoxide with 1 mol of a saturated dibasic acid. After the diol-unsaturated diacid adduct is formed, it is then heated to either about 300° C if no catalyst is used or about 200° C if a catalyst, such as a high boiling tertiary amine, is used. In this manner a rigid, weather resistant foam is produced.

DESCRIPTION OF INVENTION

The first major reactant useful in the processes and compositions of this invention is an alpha-beta mono ethylenically unsaturated dicarboxylic acid or anhydride having about four to 10 carbon atoms per molecule. Examples of these acids or anhydrides include, itaconic, citraconic, mesaconic, maleic, fumaric, glutaconic, and the like. Generally it is preferred that these acids be used in the form of their anhydride where possible. The most preferred acids or anhydrides useful herein can be represented by the general formula:

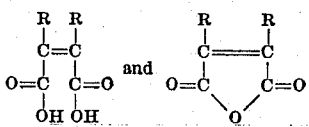

In the above formula, R is selected from H and $C_1$ to $C_6$ alkyl. However, in no instance should total number of carbon atoms in a particular molecule exceed about 10.

Reacted with the above unsaturated acid or anhydride is a glycol or diol, i.e., a polyalcohol having two alcoholic OH groups per molecule, and having a least six and not more than about 50 carbon atoms per molecule. These diols can have internal ether, ketone or ester groups but should contain no other functional groups reactive with carboxylic acids, or sites of reactive unsaturation. Examples of the useful compounds include the simple or normally occuring diols such as hexylene glycol or 1,6 hexane diol, the heptane, octane, nonane and decane glycols, and the like. Also useful are the polyglycols having less than about 50 carbon atoms per molecule including the low molecular weight polyethylene and polypropylene glycols. Preferred among the various diols are those having internal ester groups such as those resulting from the reaction of about 2.0 mols of a diol with about 1 mol of a dibasic acid. These diol-esters must be essentially monomeric in nature, i.e., containing not more than about 50 carbon atoms per molecule. Examples of the glycols useful in forming these diol-esters include ethylene glycol, propylene glycol, 1,3 propanediol, butylene glycol, 1,3 butanediol, 1,4 butanediol, the pentanediols, the hexane diols, and the like. Also useful in forming these diol-esters are the various oxides such as propylene oxide, ethylene oxide, butylene oxide, etc. The diol or oxide is reacted with a diabasic carboxylic acid having no sites of polymerizable unsaturation to form the diol-ester. Examples of said dicarboxylic acid include the aliphatic diacids, such as succinic, adipic, sebacic, hexahydrophthalic, and the like, and the aromatic dibasic acids such as phthalic, isophthalic, terephthalic, the napthalene dicarboxylic acids, etc. Most preferred among the diol-esters are the esters of aromatic dibasic acids having the general formula:

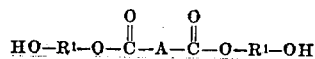

wherein A is an aromatic nucleus and $R^1$ is an aliphatic group containing from two to four carbon atoms. The aromatic diol-esters can be prepared by several known methods including the condensation of the base diacid with ether a glycol or a mono epoxide such as propylene oxide, ethylene oxide, butylene oxide, etc. In instances where the two acid groups are in the ortho position on the aromatic ring the anhydride can be used as a starting material and is readily condensed with a glycol at low temperature. Examples of aromatic diol-esters include bis(2-hydroxyethyl) terephthalate, bis(2-hydroxyethyl)isophthalate, and the like.

According to the process of this invention the diol described above is reacted with the above unsaturated dicarboxylic acid. In carrying out this reaction about 1.2 to about 2 mols of the unsaturated acid should be reacted with each mol of the diol. If less than about 2 mols of the acid are added, stringent controls such as high pressure must be maintained to insure that polymerization does not occur. Normally, though this reaction can be carried out by condensation methods well known in the art. For example, if an extremely pure product is desired an excess of the unsaturated dicarboxylic acid can be added to the diol and then removed by distillation after the reaction is completed. In the preferred instances where the dicarboxylic acid is in the form of an anhydride lower temperatures than those required for a typical carboxylic acid alcohol condensation can be used. Thus where the unsaturated dicarboxylic acid is to be reacted with the diols of this invention, temperatures in the range of about 120° C to about 265° C can be used while temperatures as low as 80° C can be used if the unsaturated dicarboxylic acid is in its anhydride form.

In order to form the rigid foams according to the methods of this invention, the unsaturated diacid-diol adduct as prepared above is decarboxylated by the use of elevated temperatures or the use of lower temperatures and a catalyst. The preferred type of catalyst is tertiary amine having a boiling point in excess of about 200° C. Examples include quinoline or diethylene triamine. When heat alone is used decarboxylation can occur in the range of about 250° to 400° C, while if high boiling tertiary amine catalyst is used, decarboxylation can occur at about 150° – 225° C without difficulty. Preferably the tertiary amine should be present at about the 0.25 to 10.0 weight percent level based on the total reactant solids.

As the unsaturated diacid-diol adduct undergoes decarboxylation according to the above methods, addition homopolymerization occurs. Since most of the four to 10 carbon containing unsaturated dibasic acids will not homo polymerize, it is thought that this polymerization results from the addition polymerization of the decarboxylated version of the unsaturated diacid-diol adduct. Since both polymerization and carbon dioxide formation occur simultaneously, a polymeric foam results.

This foam is useful in the construction of radar domes, in the insulation of homes, refrigerators, and pipes, in protective packaging, in providing added bouyancy in pleasure boats, and as a housing construction material. Likewise, the foams prepared in this manner can be used in injection molding and particularly because of their brown color, these foams can be used as a decorative substitute for wood.

In the following examples parts and percentages unless otherwise stated are by weight.

EXAMPLE 1

Bis(2-hydroxyethyl)terephthalate is prepared by: condensing ethylene oxide and terephthalic acid in a mixture of about 20 percent ethyl benzene, and 80 percent xylene; extracting the thus formed diester with water and then recrystallizing from water. To 1 mol of this terephthalate ester are added 2 mols of maleic anhydride and the resulting mixture is heated to about 115° C and held for 20 minutes. The resulting product having the structure:

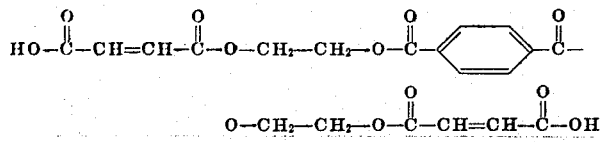

is placed in a steel container and immersed in a 300° C oil bath for about 30 minutes resulting in a dark brown, crosslinked, polymeric, rigid foam.

EXAMPLE 2

Using the same procedure as in Example 1, a rigid infusible foam is prepared by heating the product having the above formula to 170° C in the presence of about 2.0 weight percent of quinoline based on the total product weight.

EXAMPLE 3

Using the same procedure as in Example 1, the reaction product of 2 mols of maleic anhydride and 1 mol of 1,6 hexane diol is obtained. This product is heated to about 200° C in the presence of about 2.0 weight percent based on the product weight of triethylene diamine. After about 15 minutes at the temperature a foam results which upon cooling is tough and rigid.

EXAMPLE 4

Using the same procedure as in Example 3, 2 mols of maleic anhydride are reacted with the product obtained by reacting 2 mols of ethylene oxide with 1 mol of adipic acid. This product is heated to 275° C without a catalyst and held for 20 minutes resulting in a foamed product which upon cooling solidifies to a semi-rigid foam.

It is to be understood that the foregoing detailed description is given merely by way of illustration and that many variations may be made therein without departing from the spirit of the invention.

The embodiments of this invention in which an exclusive property or privilege is claimed are defined as follows:

1. A process for preparing a rigid foam, which comprises:
   A. reacting (i) an alpha-beta ethylenically unsaturated dicarboxylic acid having about four to 10 carbon atoms per molecule with (ii) a diol having from six to 50 carbon atoms per molecule in the ratio of mols of (i) to mols of (ii) in the range of about 2:1 to 1.2:1, to form an unsaturated diacid-diol adduct; and
   B. heating said adduct to a temperature and for a period of time sufficient to effect decarboxylation of said adduct, and thereby produce the foam.
2. The process of claim 1 wherein step B is carried out in the presence of a tertiary amine.
3. The process of claim 1 wherein step B is carried out at about 250° to 400° C.
4. The process of claim 2 wherein step B is carried out at about 150° to 225° C.
5. The process of claim 2 wherein said amine is present at about the 0.25 to 10.0 weight percent level.
6. The process of claim 1 wherein (i) is selected from the group consisting of

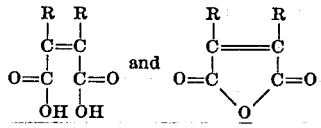

wherein R is selected from H and $C_1$ to $C_6$ alkyl.

7. The process of claim 2 wherein (ii) has the general formula

wherein A is an aromatic nucleus and $R^1$ is an aliphatic group having from two to four carbon atoms.

8. The process of claim 3 wherein step B is carried out at about 285° to 315° C.
9. The process of claim 4 wherein step B is carried out at about 160° to 180° C.
10. The process of claim 1 wherein (i) is maleic anhydride and (ii) is bis(2-hydroxyethyl)terephthalate.
11. The rigid foam obtained by the process of claim 1.
12. The rigid foam obtained by the process of claim 2.

* * * * *